Sept. 12, 1961

H. J. VAN DOORNE
BELT TRANSMISSION WITH AT LEAST ONE AXIALLY
EXPANDABLE BELT PULLEY
Filed Jan. 18, 1960

2,999,395

INVENTOR.
HUBERTUS J. VAN DOORNE
BY
Wenderoth, Lind + Ponack
Attys.

United States Patent Office 2,999,395
Patented Sept. 12, 1961

2,999,395
BELT TRANSMISSION WITH AT LEAST ONE AXIALLY EXPANDABLE BELT PULLEY
Hubertus J. van Doorne, A54a Stationsstraat, Deurne, Netherlands
Filed Jan. 18, 1960, Ser. No. 9,147
Claims priority, application Netherlands Jan. 21, 1959
3 Claims. (Cl. 74—242.14)

The invention relates to a belt transmission having at least one expanding pulley, provided with a device for compensating for any increase in the effective length of the belt due to stretching of the belt and/or wear of the side faces.

If in a belt transmission of this kind the belt should elongate or the sides of the belt become worn, the belt will run on another diameter other than that originally intended, so that the transmission ratio undergoes a change. The main purpose of the invention is to ensure that the effective length of the belt is maintained or is re-adjusted with a view to the limits imposed by the highest and lowest transmission ratios required.

Furthermore when a belt transmission of the above kind is in an inaccessible position, e.g. under the floor of a motor vehicle, it is almost impossible to ascertain whether or not any elongation of the belt or wear in the belt has taken place without removing an inspection cover or the like.

The object of the invention is in a belt transmission having an expanding pulley or pulleys to provide an electrically operated device which is controlled by the movable components of one of the expanding pulleys and which is arranged to close a circuit, if and when the distance separating the fixed and moving component exceeds a predetermined amount.

Another object of the invention is an electric circuit which is closed by said contact and operates a visual or audible warning signal. The adjustment must be such, that the signal is operated before the effective length of the belt increases to an undesirable amount. Due to elongation of the belt or to wear of the opposite sides of the belt, the adjustment of the maximum or of the minimum reduction, the belt will run on a larger than the original maximum effective diameter. This is not a serious drawback as long as the belt does not pass beyond the conical tread surfaces of the belt pulley, provided that the pulley halves do not approach each other to such an extent that they come into contact with each other, in which case there is no longer sufficient tension in the belt to maintain the drive.

On operation of the signal, the driver, is warned that the effective length of the belt has become too large and it is possible for him or her to effect the adjustment by hand, e.g. by means of a device accessible from the outside e.g. a screwed spindle extending to a position which is readily accessible and by means of which it is possible to increase the mutual distance of the belt pulleys until the correct adjustment is again obtained.

Another object of the invention is an electric circuit which is closed by said contact and is arranged to operate a mechanism by means of which the distance between the pulleys is increased in such a way that the increase of the effective length of the belt is automatically compensated.

Consequently closing the circuit may be used:

(a) For operating a visual or audible warning by which the driver of the motor vehicle, in which the transmission is incorporated, is made aware of the necessity of increasing the distance between the axes of the primary and secondary belt pulleys which may be done e.g. by means of a manually operated device.

(b) For putting into action a mechanism which automatically compensates the increase in length of the belt, or (c) For effecting a combination of (a) and (b).

In a preferred construction in accordance with the invention the belt transmission having an expanding pulley, one component or half of which is axially displaceable and the other component remains fixed, an axially projecting stud is provided which extends through part of the fixed pulley component in a position where it does not interfere with the running of the belt and which is adapted on displacement by the movable pulley component to close the contact in the electrical circuit of the visual or audible warning device and/or to effect operation of the mechanism of the automatic compensating device.

The invention is illustrated in the accompanying drawings, in which—

Figure 2:
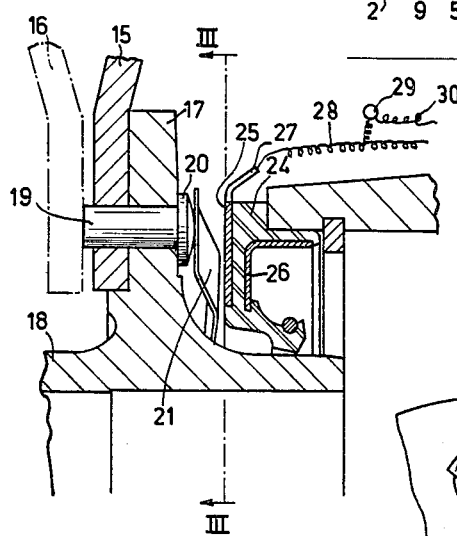
FIGURE 2 is an axial section of part of a belt pulley and of its hub.
Figure 3:
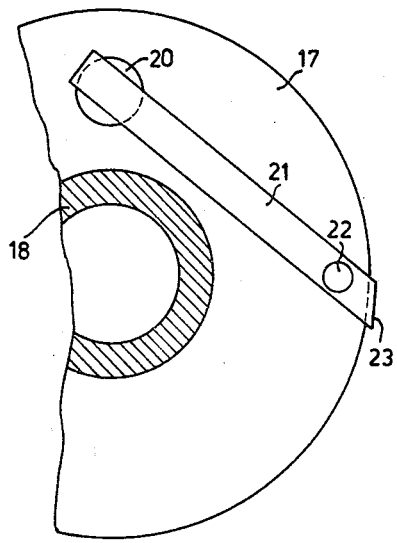

FIGURE 3 a transverse section along the line III—III of FIGURE 2.

Figure 1:
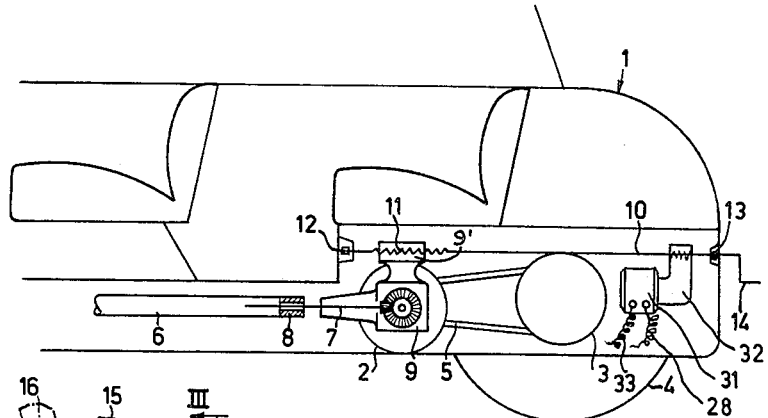
FIGURE 1 is a diagrammatic longitudinal section of a motor vehicle provided with a transmission according to the invention.

Referring to FIGURE 1, 1 indicates a motor vehicle fitted with a belt transmission having expanding belt pulleys including a primary or driving belt pulley 2 and a secondary or driven belt pulley 3, the latter of which drives one of the rear wheels 4. A V-belt connects the pulleys 2 and 3, the effective diameter of the pulleys 2 and 3 being determined by the mutual distance separating the two halves of each belt pulley in order to obtain a variable drive ratio.

6 is a transmission shaft from the engine (not shown) at the front of the vehicle. Shaft 6 drives through splines 8, a pinion shaft 7 so as to permit of telescoping movements between the two shafts in a longitudinal direction. A distribution box 9 is adjustable in a direction fore and aft of the vehicle, adjustment being by means of a spindle 10 having a screw threaded part 11 which engages a corresponding screw in the body part 9' of the distribution box 9. The screw spindle 10 is held against longitudinal movements, being fixed at its front and/or at its rear ends by means e.g. of a square or otherwise non-round collar 12 and 13, which collars are located in a recess of a wall of the vehicle. A removable handle 14 on the spindle 10 facilitates rotation of this spindle when it is desired to adjust the position of the distribution box 9 and with it the primary driving pulley 2, should this become necessary by elongation of the belt or by wear of the belt surfaces.

As will be seen from the drawing, the whole transmission is not readily accessible so that it is impossible to observe whether a displacement of the pulley 2 is necessary to compensate an increase in the effective length of the belt. In order to direct the attention of the driver of the vehicle to the fact that it is necessary to adjust the position of the distribution box 9 and that of the primary pulley 2, a visible or audible warning device may be arranged on or behind the instrument panel. This warning device signal is electrically operated and forms part of an electrical circuit which is closed by a device such for example as shown in FIGURES 2 and 3.

Both the primary pulley 2 or the secondary pulley 3 may comprise a fixed or axially immovable half-pulley 15 and an axially displaceable half-pulley 16, the latter being shown in a position in which it is in close proximity to the half-pulley 15 and separated from it by a small distance. The half-pulley 15 is fast on a flange 17 of the hub 18 of this half-pulley. Slidably carried in a hole in the flange 17 of the half-pulley 15 is a stud 19. This stud, which has a head 20, normally abuts against the flange 17, being maintained in this position by means of a leaf spring 21, secured by a rivet 22 to the flange 17. The inturned end 23 of spring 21 engages the circumference of the flange 17 and maintains this spring in its correct position.

A stationary ring 24 of insulated material carries conductor ring 25, which is provided with a terminal 27 for connection to the electrical circuit. The conductor ring 25 is positioned adjacent the leaf spring 21. The insulating ring 24 serves as a seal against the hub 18 and is reinforced by a ring 26 of L-shaped section.

If, in the circumstances mentioned above, the half-pulley 16 should approach the fixed half-pulley 15 to a degree which makes an adjustment of the distribution box 9 necessary, the half-pulley 16 forces the stud 19 to the right of the drawing, so that the leaf spring 21 makes contact with the conductor 25 and an electrical circuit is closed. The half-pulley 15 and its flange 17 are connected to earth through the body of the vehicle, while the terminal eye 27 of the ring 25 is connected to a wire 28 in the electrical circuit.

The wire 28 leads to a visible or audible signal 29 which is arranged at a suitable place and which is connected by a wire 30 with the battery of the vehicle (not shown).

Due to the audible or visual warning device 29 being arranged in the electrical circuit, the driver receives a warning that it is necessary to adjust the distribution box in order to compensate for increase in the effective length of the belt. Adjustment is then effected by placing the handle 14 on the head 12 or 13 at one or other of the ends of the screwed spindle 10.

The arrangement according to FIGURES 2 and 3 may also be used for setting into operation a mechanism by which the mutual distance separating the pulleys is increased and thus the effective length of the belt is automatically compensated.

This automatic adjusting mechanism may be executed in a way as schematically shown in the drawing. The wire 28 connects the terminal eye 27 of the ring 25 further to an electric motor 31 which through the intermediary of a reduction gear 32 is adapted to rotate the spindle 10. The electric motor 31 is connected by a wire 33 with the battery of the vehicle.

If the contact 21, 25 is closed by the pulley-half 16 approaching the pulley-half 15, the electric motor 31 is set into operation and the spindle 10 is rotated, thereby shifting the distribution box 9 until the distance between the axes of the pulleys 2 and 3 is increased to such an extent that the elongation or wear of the belt is compensated. The tension of the belt 5 forces the pulley-halves 15 and 16 apart and the contact between the spring 21 and the ring 25 is interrupted, so that the electric motor 31 is stopped.

The transmission may be such that the signal 29 or the automatic adjusting device 31, 32 is arranged as an alternative so that the distribution box 9 may be shifted either by the handle 14 or by the electric motor 31, or both devices may be arranged in combination.

What is claimed is:

1. A belt transmission comprising two pulleys, at least one of which is an expandable pulley, a belt connecting said pulleys, and a device for adjusting the distance between the axes of said pulleys, a normally open electrical make-and-break contact, a part of said contact being carried by a pulley half of said expandable pulley and being controlled by the relative axial displacement of the pulley halves of said expandable pulley so that by approaching said pulley halves one with respect to the other to a predetermined distance, said contact is closed and by separating said pulley halves beyond said predetermined distance, said contact is opened.

2. A belt transmission comprising two pulleys, at least one of which is an expandable pulley, a belt connecting said pulleys, and a device for adjusting the distance between the axes of said pulleys, a normally open electrical make-and-break contact, said displaceable pulley having one axially displaceable pulley half and one axially non-displaceable pulley half, a stud extending axially through the central part of the axially non-displaceable pulley half and being adapted to be axially shifted by said displaceable pulley half against the action of a spring if the displaceable pulley half approaches the non-displaceable pulley half to a predetermined distance, the said axial movement of said stud resulting in closing said make-and-break contact.

3. A belt transmission comprising two pulleys, at least one of which is an expandable pulley, a belt connecting said pulleys, a device for adjusting the distance between the axes of said pulleys, a normally open electrical make-and-break contact, said displaceable pulley having one axially displaceable pulley half and one axially non-displaceable pulley half, a stud extending axially through the central part of the axially non-displaceable pulley half, a head on said stud, a leaf spring fixed to said non-displaceable pulley half and acting on said head, a stationary part of said belt transmission, a conductor ring concentric with the axis of said pulley and carried by said stationary part through the intermediary of an insulated part, the length of said stud and the space between said leaf spring and said conductor ring being such that if the displaceable pulley half approaches the non-displaceable pulley half to a predetermined distance, said displaceable pulley half shifts said stud which urges said leaf spring against said conductor ring to make electrical contact therewith.

References Cited in the file of this patent

UNITED STATES PATENTS

| | | |
|---|---|---|
| 567,211 | Young et al. | Sept. 8, 1896 |
| 2,346,047 | Otto | Apr. 4, 1944 |
| 2,506,738 | Raypholtz | May 9, 1950 |
| 2,910,879 | Hanks | Nov. 3, 1959 |
| 2,927,471 | Long | Mar. 8, 1960 |